US012374279B2

(12) United States Patent
Lim et al.

(10) Patent No.: US 12,374,279 B2
(45) Date of Patent: Jul. 29, 2025

(54) DISPLAY DEVICE AND METHOD OF DRIVING DISPLAY DEVICE

(71) Applicant: Samsung Display Co., LTD., Yongin-si (KR)

(72) Inventors: Kyoungho Lim, Yongin-si (KR); Seungho Park, Yongin-si (KR); Jaehoon Lee, Yongin-si (KR); Yoonju Kim, Yongin-si (KR); Jongha Shin, Yongin-si (KR); Kitae Yoon, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/420,109

(22) Filed: Jan. 23, 2024

(65) Prior Publication Data

US 2024/0312402 A1 Sep. 19, 2024

(30) Foreign Application Priority Data

Mar. 15, 2023 (KR) ........................ 10-2023-0033646

(51) Int. Cl.
*G09G 3/3208* (2016.01)

(52) U.S. Cl.
CPC ... *G09G 3/3208* (2013.01); *G09G 2320/0257* (2013.01); *G09G 2320/045* (2013.01); *G09G 2320/0626* (2013.01); *G09G 2320/103* (2013.01); *G09G 2340/0464* (2013.01)

(58) Field of Classification Search
None
See application file for complete search history.

(56) References Cited

U.S. PATENT DOCUMENTS

| | | | | |
|---|---|---|---|---|
| 9,659,514 | B2 | 5/2017 | Jang | |
| 9,691,353 | B2 * | 6/2017 | Joo | G06V 10/50 |
| 10,311,799 | B2 | 6/2019 | Park et al. | |
| 2019/0026861 | A1 * | 1/2019 | Kim | G09G 3/3208 |
| 2019/0213953 | A1 * | 7/2019 | Koh | G09G 3/3233 |

FOREIGN PATENT DOCUMENTS

| | | | |
|---|---|---|---|
| KR | 1020150066888 | A | 6/2015 |
| KR | 1020180002948 | A | 1/2018 |
| KR | 101856928 | B1 | 5/2018 |
| KR | 1020200081174 | A | 7/2020 |

* cited by examiner

*Primary Examiner* — Stephen T. Reed
(74) *Attorney, Agent, or Firm* — CANTOR COLBURN LLP

(57) ABSTRACT

Disclosed is a display device, which includes a display panel that displays an image, and a controller that receives image data corresponding to a frame and drives the display panel. The controller divides the image data into a plurality of blocks and determines whether the image is a fixed image based on an inter-frame variation of a block of the plurality of blocks. The controller changes an afterimage prevention operation mode when the number of blocks displaying the fixed image for a period equal to or greater than a first reference value among the plurality of blocks is equal to or greater than a second reference value.

20 Claims, 13 Drawing Sheets

EF1

| | | |
|---|---|---|
| 1 | 0 | −1 |
| 1 | 0 | −1 |
| 1 | 0 | −1 |

EF2

| | | |
|---|---|---|
| 1 | 1 | 1 |
| 0 | 0 | 0 |
| −1 | −1 | −1 |

DISPLAY DEVICE AND METHOD OF DRIVING DISPLAY DEVICE

CROSS-REFERENCE TO RELATED APPLICATIONS

This application claims priority to Korean Patent Application No. 10-2023-0033646, filed on Mar. 15, 2023, and all the benefits accruing therefrom under 35 U.S.C. § 119, the content of which in its entirety is herein incorporated by reference.

BACKGROUND

Field

Embodiments of the present disclosure described herein relate to a display device and a method of driving the display device, and more particularly, relate to a display device including a display panel having an increased lifetime and a method of driving a display device.

Description of the Related Art

Various types of display devices may be used to provide image information. For example, an organic light emitting display device, an inorganic light emitting display device, a quantum dot display device, a liquid crystal display device, and the like may be used as display devices. In particular, the organic light emitting display devices include organic light emitting elements having a predetermined lifetime. Therefore, a lifespan difference may occur for each pixel, and an afterimage may occur.

SUMMARY

Embodiments of the present disclosure provide a display device including a display panel having an increased lifetime.

Embodiments of the present disclosure provide a method of driving a display device capable of improving the lifespan of a display panel.

According to an embodiment of the present disclosure, a display device includes a display panel that displays an image, and a controller that receives image data corresponding to a frame and drives the display panel. The controller divides the image data into a plurality of blocks and determines whether the image is a fixed image based on an inter-frame variation of a block of the plurality of blocks, and the controller changes an afterimage prevention operation mode when the number of blocks displaying the fixed image for a period equal to or greater than a first reference value among the plurality of blocks is equal to or greater than a threshold number.

According to an embodiment, when the controller determines the inter-frame variation of a block of the plurality of blocks is equal to or less than a first threshold, the controller may be configured to determine that the block displays the fixed image.

According to an embodiment, when the controller determines that the block displays the fixed image, the controller may be configured to accumulate a stack value of the block, and when the controller determines that the block displays a moving image, the controller may be configured to subtract the stack value of the block.

According to an embodiment, the controller may be configured to determine a state of each of the plurality of blocks, update a plurality of stack values corresponding to the plurality of blocks on a one-to-one basis based on the states of the plurality of blocks, where updating the plurality of stack values is every preset period, and change the afterimage prevention operation mode when a number of blocks having a stack value equal to or greater than the first reference value among the plurality of blocks is equal to or greater than the threshold number.

According to an embodiment, the state may be a first state of displaying a fixed image or a second state of displaying a moving image.

According to an embodiment, the controller may divide second image data corresponding to a second frame into a second plurality of blocks, where the second frame is subsequent or prior to the frame, calculate a difference between first block image information of each of the plurality of blocks of the frame and second block image information of each of the second plurality of blocks of the second frame, determine a block of the plurality of blocks is in a first state when a ratio of the difference associated with the block is less than or equal to a state reference value, and determine that the block is in a second state when the ratio of the difference is greater than the state reference value.

According to an embodiment, each of the first block image information and the second block image information may include at least one of an average luminance, an average gray level, and data about a detected edge of each of the plurality of blocks and the second plurality of blocks.

According to an embodiment, the plurality of blocks may include a first block, and the plurality of stack values may include a first stack value corresponding to the first block, and when the first block is in the first state, the controller may accumulate a first value to the first stack value, and when the first block is in the second state, the controller may subtract a second value from the first stack value.

According to an embodiment, the first value may be based on an average luminance of the first block.

According to an embodiment, the first value when the average luminance is a first luminance may be less than the first value when the average luminance is a second luminance greater than the first luminance.

According to an embodiment, the afterimage prevention operation mode may include a first operation mode and a second operation mode different from the first operation mode, and the controller may change the afterimage prevention operation mode from the first operation mode to the second operation mode when the number of the blocks is equal to or greater than the threshold number.

According to an embodiment, in the first operation mode, the controller may reduce the luminance of the image data by a first ratio when the luminance of the image data is greater than or equal to a first reference luminance, in the second operation mode, the controller may reduce the luminance of the image data by a second ratio when the luminance of the image data is equal to or greater than a second reference luminance, and the first reference luminance may be greater than or equal to the second reference luminance.

According to an embodiment, the second ratio may be greater than or equal to the first ratio.

According to an embodiment, the controller may position and display the image data by X number of pixels in a first period in the first operation mode, may position and display the image data by Y number of pixels in a second period in the second operation mode, and the Y number may be greater than or equal to the X number.

According to an embodiment, the second period may be less than or equal to first period.

According to an embodiment of the present disclosure, a method of driving a display device includes a receiving image data, dividing the image data into a plurality of blocks and determining a state of each of the plurality of blocks, updating a plurality of stack values corresponding to the plurality of blocks on a one-to-one basis based on the state of each of the plurality of blocks, wherein updating the plurality of stack values is at preset periods, detecting the number of blocks having a stack value greater than or equal to a first reference value among the plurality of blocks, and changing an afterimage prevention operation mode when the number of blocks having the stack value equal to or greater than the first reference value is greater than or equal to a threshold number.

According to an embodiment, the determining of the state may include calculating first block image information of each of the plurality of blocks of a first frame, dividing second image data corresponding a second frame into a second plurality of blocks, where the second frame is subsequent or prior to the first frame, calculating second block image information of each of the second plurality of blocks of the second frame, calculating a difference between the first block image information and the second block image information, comparing the difference with a state reference value, and determining that a block of the plurality of blocks is in a first state when a ratio of the difference associated with the block is less than or equal to the state reference value, determining that the block is in a second state different from the first state when the ratio of the difference associated with the exceeds the state reference value.

According to an embodiment, the plurality of blocks may include a first block, and the plurality of stack values may include a first stack value corresponding to the first block, and the updating of the plurality of stack values may include accumulating a first value to the first stack value when the first block is in the first state and subtracting a second value from the first stack value when the first block is in the second state.

According to an embodiment, the first value may be based on an average luminance of the first block, and the first value when the average luminance is a first luminance may be less than the first value when the average luminance is a second luminance higher than the first luminance.

According to an embodiment, each of the first block image information and the second block image information may include at least one of an average luminance, an average gray level, and data about a detected edge of each of the plurality of blocks and the second plurality of blocks.

BRIEF DESCRIPTION OF THE DRAWINGS

A detailed description of each drawing is provided to facilitate a more thorough understanding of the drawings referenced in the detailed description of the present disclosure.

DETAILED DESCRIPTION

Figure 1:
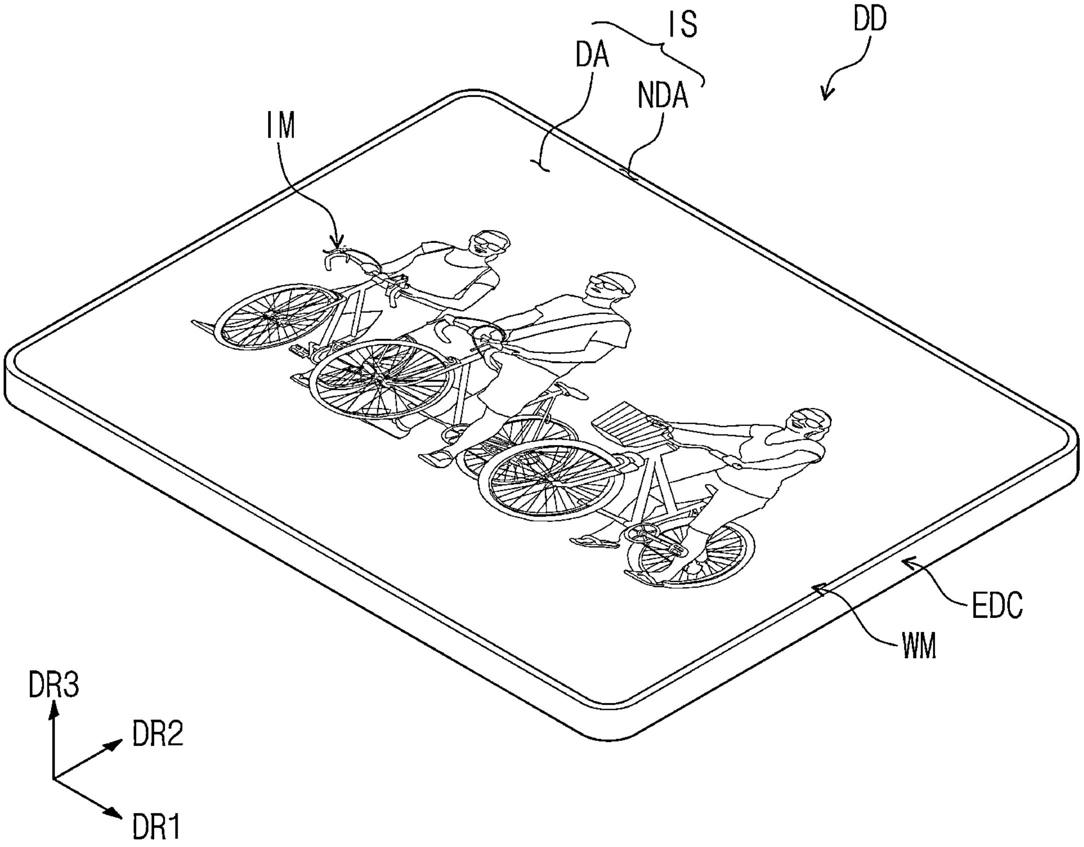
FIG. 1 is a perspective view illustrating an embodiment of a display device, according to the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used to differentiate one component from another component. For example, a first component may be named as a second component, and vice versa, without departing from the spirit or scope of the present disclosure. A singular form, unless otherwise stated, includes a plural form.

Also, the terms "under", "beneath", "on", and "above" are used to describe a relationship between components illustrated in a drawing. The terms are relative and are described with reference to a direction indicated in the drawing. It will be understood that when an element is referred to as being "on" another element, it can be directly on the other element or intervening elements may be present therebetween. In contrast, when an element is referred to as being "directly on" another element, there are no intervening elements present.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and working components, and may include processes, functions, properties, procedures, subroutines, program code segments, drivers, firmwares, micro-codes, circuits, data, databases, data structures, tables, arrays, or variables.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

Figure 2:
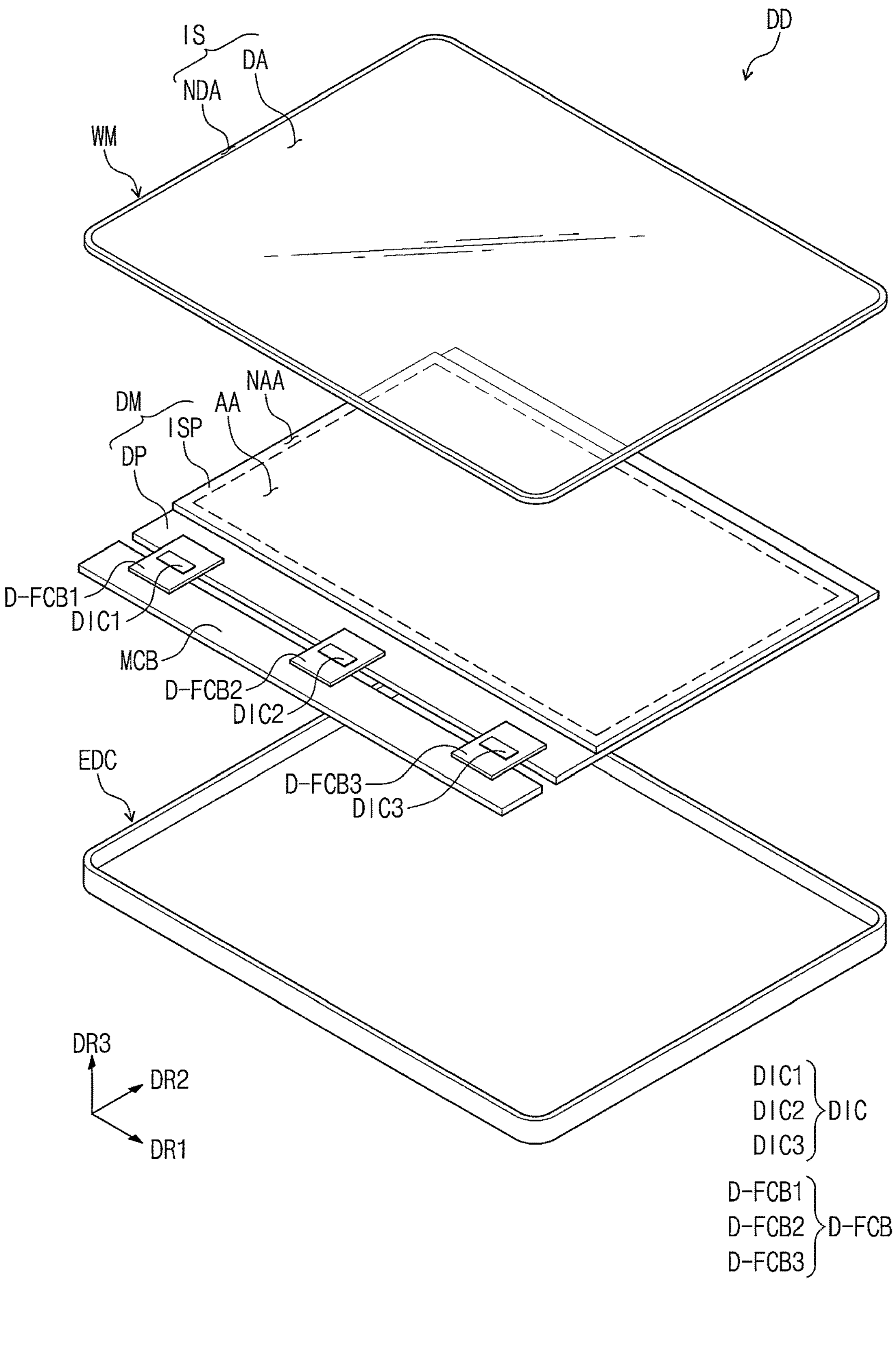
FIG. 2 is an exploded perspective view of an embodiment of a display device, o according to the present disclosure.

FIG. 1 is a perspective view illustrating an embodiment of a display device DD, according to the present disclosure. FIG. 2 is an exploded perspective view of an embodiment of the display device DD, according to the present disclosure.

Referring to FIGS. 1 and 2, the display device DD may be a device activated based on an electrical signal. In some examples, the display device DD may be a mobile phone, a foldable mobile phone, a notebook computer, a monitor, a television, a tablet computer, a car navigation system, a game console, or a wearable device, but is not limited thereto. FIG. 1 illustrates that the display device DD is a tablet computer as an example.

The display device DD has a rectangular shape having a relatively longer side in a first direction DR1 and a relatively shorter side in a second direction DR2 intersecting the first direction DR1. However, the shape of the display device DD is not limited thereto, and the shape may be modified into various shapes. It is to be understood that the terms "longer" and "shorter," when recited with respect to a shape of an object (e.g., "longer sides" and "shorter sides" of an object), are relative terms expressing dimensions of the object. The display device DD may display an image IM in a third direction DR3, on a display surface IS parallel to a plane corresponding to the first direction DR1 and the second direction DR2. The display surface IS on which the image IM is displayed may correspond to a front surface of the display device DD.

According to an embodiment, a front surface (or top surface) and a rear surface (or a bottom surface) of each of members of the display device DD are defined based on a direction that the image IM is displayed. The front surface and the rear surface may be opposite to each other in the third direction DR3, and a normal direction of each of the front surface and the rear surface may be parallel to the third direction DR3. The distance between the front surface and the back surface in the third direction DR3 may correspond to the thickness of the display device DD in the third direction DR3. In one or more embodiments, the directions indicated by the first, second, and third directions DR1, DR2, and DR3 may be a relative concept (e.g., the directions are relative to one another) and may be changed to different directions.

The display device DD may detect an external input applied from the outside of the display device DD. The external input may include various types of inputs provided from the outside of the display device DD. According to an embodiment of the present disclosure, the display device DD may detect a user external input, which is applied from the outside of the display device DD. The user external input may be any one or a combination of various types of external inputs, such as, for example, a part of the user's body, light, heat, gaze, or pressure. In addition, the display device DD may detect the user external input TC (not illustrated) (also referred to herein as a touch input, a button input, or the like), which is applied to the side surface or the back surface of the display device DD depending on the structures of the display device DD, and is not limited to any one embodiment. As an example in accordance with the present disclosure, the user external input may include an input provided using an input device (e.g., a stylus pen, an active pen, a touch pen, an electronic pen, an e-pen, etc.).

The display surface IS of the display device DD may be divided into a display area DA and a non-display area NDA. The display area DA may be an area in which the image IM is displayed. A user visually perceives the image IM through the display area DA. In the example embodiment of FIG. 1, the display area DA is illustrated in the shape of a quadrangle, and vertexes of the quadrangle are rounded. However, the aspects of display area DA illustrated in FIG. 1 are by way of example, and the display area DA may have various shapes, and is not limited to any one embodiment.

The non-display area NDA is adjacent to the display area DA. The non-display of area NDA may have a given color. The non-display area NDA may surround the display area DA. Accordingly, the shape of the display area DA may be actually defined by the non-display area NDA. However, the described aspects are illustrated by way of example, and the non-display area NDA may be disposed adjacent to a single side of the display area DA or may be omitted. According to aspects of the present disclosure, the display device DD may include various embodiments, and not limited to any one embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may be a light emitting display panel. For example, the display panel DP may be an organic light emitting display panel, an inorganic light emitting display panel, an inorganic-inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. In accordance with one or more embodiments of the present disclosure, the following description is provided in which the display panel DP is an organic light emitting display panel.

The display panel DP outputs the image IM, and the output image IM may be displayed on the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP through a process subsequent to the fabrication of the display panel DP. In detail, when the input sensing layer ISP is directly disposed on the display panel DP, an internal adhesive film (not illustrated) is not disposed between the input sensing layer ISP and the display panel DP. However, in an alternative example, the internal adhesive film may be disposed between the input sensing layer ISP and the display panel DP. In this case, the input sensing layer ISP is not fabricated together with the display panel DP through the subsequent processes. In other words, after fabricating the input sensing layer ISP through a process separate from a fabrication process of the display panel DP, the input sensing layer ISP may be fixed on a top surface of the display panel DP through the internal adhesive film. In an embodiment of the present disclosure, the input sensing layer ISP may be omitted.

The window WM may include a transparent material via which the image IM may be visible. For example, the window WM may be formed of glass, sapphire, plastic, etc. An example in which the window WM is implemented with a single layer is illustrated, but the present disclosure is not limited thereto. For example, the window WM may include a plurality of layers.

In one or more embodiments, although not illustrated, the non-display area NDA of the display device DD may be actually provided by printing one area of the window WM with a material including a specific color. As an embodiment of the present disclosure, the window WM may further include a light shielding pattern for defining the non-display area NDA. The light shielding pattern, which has the form of a film having a color, may be, for example, formed through one or more coating techniques.

The window WM may be coupled to the display module DM through an adhesive film. As an embodiment of the present disclosure, the adhesive film may include an optically clear adhesive (OCA) film. However, the adhesive film is not limited thereto, but may include an adhesive agent and adhesion agent. For example, the adhesive film may include optically clear resin (OCR) or a pressure sensitive adhesive film (PSA).

An anti-reflective layer may be further interposed between the window WM and the display module DM. The anti-reflective layer reduces a reflective index of external light incident from an upper portion of the window WM. According to an embodiment of the present disclosure, the anti-reflective layer may include a retarder and a polarizer. The retarder may be a retarder of a film type or a liquid crystal coating type and may include a λ/2 retarder and/or a λ/4 retarder. The polarizer may also be a film type or a liquid crystal coating type. The film type may include a stretchtype synthetic resin film, and the liquid crystal coating type may include liquid crystals arranged in a given direction. The retarder and the polarizer may be implemented with one polarization film.

As an example in accordance with the present disclosure, the anti-reflection layer may also include color filters. The arrangement of color filters may be determined in consideration of colors of light generated from a plurality of pixels PX (described with reference to FIG. 3) included in the display panel DP. The anti-reflective layer may further include a light shielding pattern.

The display module DM may display the image IM according to electrical signals and may transmit/receive information about an external input. The display module DM may be defined by an effective area AA and a non-effective area NAA. The effective area AA may be defined as an area through which the image IM provided from the display module DM is output. The effective area AA may be defined as an area in which the input sensing layer ISP senses an external input applied from the outside.

The non-effective area NAA is adjacent to the effective area AA. For example, the non-effective area NAA may surround the effective area AA. However, aspects of the non-effective area NAA and the effective area AA are illustrated by way of an example and are not limited thereto. The non-effective area NAA may be defined in various shapes and is not limited to any one embodiment. According to an embodiment, the effective area AA of the display module DM may correspond to at least a portion of the display area DA.

The display module DM may further include a main circuit board MCB, a plurality of flexible circuit films D-FCB, and a plurality of driving chips DIC. The main circuit board MCB may be connected to the flexible circuit films D-FCB to be electrically connected to the display panel DP. The flexible circuit films D-FCB are connected to the display panel DP to electrically connect the display panel DP and the main circuit board MCB. The main circuit board MCB may include a plurality of driving devices. The plurality of driving devices may include a circuit part (also referred to herein as circuitry or a circuit portion) to drive the display panel DP. The driving chips DIC may be mounted on the flexible circuit films D-FCB.

As an example in accordance with the present disclosure, the flexible circuit films D-FCB may include a first flexible circuit film D-FCB1, a second flexible circuit film D-FCB2, and a third flexible circuit film D-FCB3. The driving chips DIC may include a first driving chip DIC1, a second driving chip DIC2, and a third driving chip DIC3. The first to third flexible circuit films D-FCB1, D-FCB2, and D-FCB3 may be disposed to be spaced apart from each other in the first direction DR1 and may be connected to the display panel DP to electrically connect the display panel DP and the main circuit board MCB. The first driving chip DIC1 may be mounted on the first flexible circuit film D-FCB1. The second driving chip DIC2 may be mounted on the second flexible circuit film D-FCB2. The third driving chip DIC3 may be mounted on the third flexible circuit film D-FCB3.

However, embodiments of the present disclosure are not limited thereto. For example, the display panel DP may be electrically connected to the main circuit board MCB through one flexible circuit film, and a single driving chip may be mounted on the one flexible circuit film. In addition, the display panel DP may be electrically connected to the main circuit board MCB through four or more flexible circuit films, and driving chips may be respectively mounted on the flexible circuit films.

Although FIG. 2 illustrates a structure in which the first to third driving chips DIC1, DIC2, and DIC3 are respectively mounted on the first to third flexible circuit films D-FCB1, D-FCB2, and D-FCB3, the present disclosure is not limited thereto. For example, the first to third driving chips DIC1, DIC2, and DIC3 may be directly mounted on the display panel DP. In this case, a portion of the display panel DP on which the first to third driving chips DIC1, DIC2, and DIC3 are mounted may be bent and disposed on the rear surface of the display module DM. In addition, the first to third driving chips DIC1, DIC2, and DIC3 may be directly mounted on the main circuit board MCB.

The input sensing layer ISP may be electrically connected to the main circuit board MCB through the flexible circuit films D-FCB. However, an embodiment of the present disclosure are not limited thereto. In detail, the display module DM may additionally include a separate flexible circuit film for electrically connecting the input sensing layer ISP to the main circuit board MCB.

The display device DD further includes an external case EDC accommodating the display module DM. The external case EDC may be combined with the window WM to define the appearance of the display device DD. The external case EDC absorbs shock applied from the outside and prevents foreign material/moisture or the like from infiltrating into the display module DM such that components accommodated in the external case EDC are protected. In one or more embodiments, in accordance with example aspects of the present disclosure, the external case EDC may be provided in a form in which a plurality of accommodating members are combined.

The display device DD according to an embodiment may further include an electronic module including various functional modules for operating the display module DM, a power supply module for supplying a power necessary for overall operations of the display device DD, and a bracket coupled with the display module DM and/or the external case EDC to partition an inner space of the display device DD.

Figure 3:
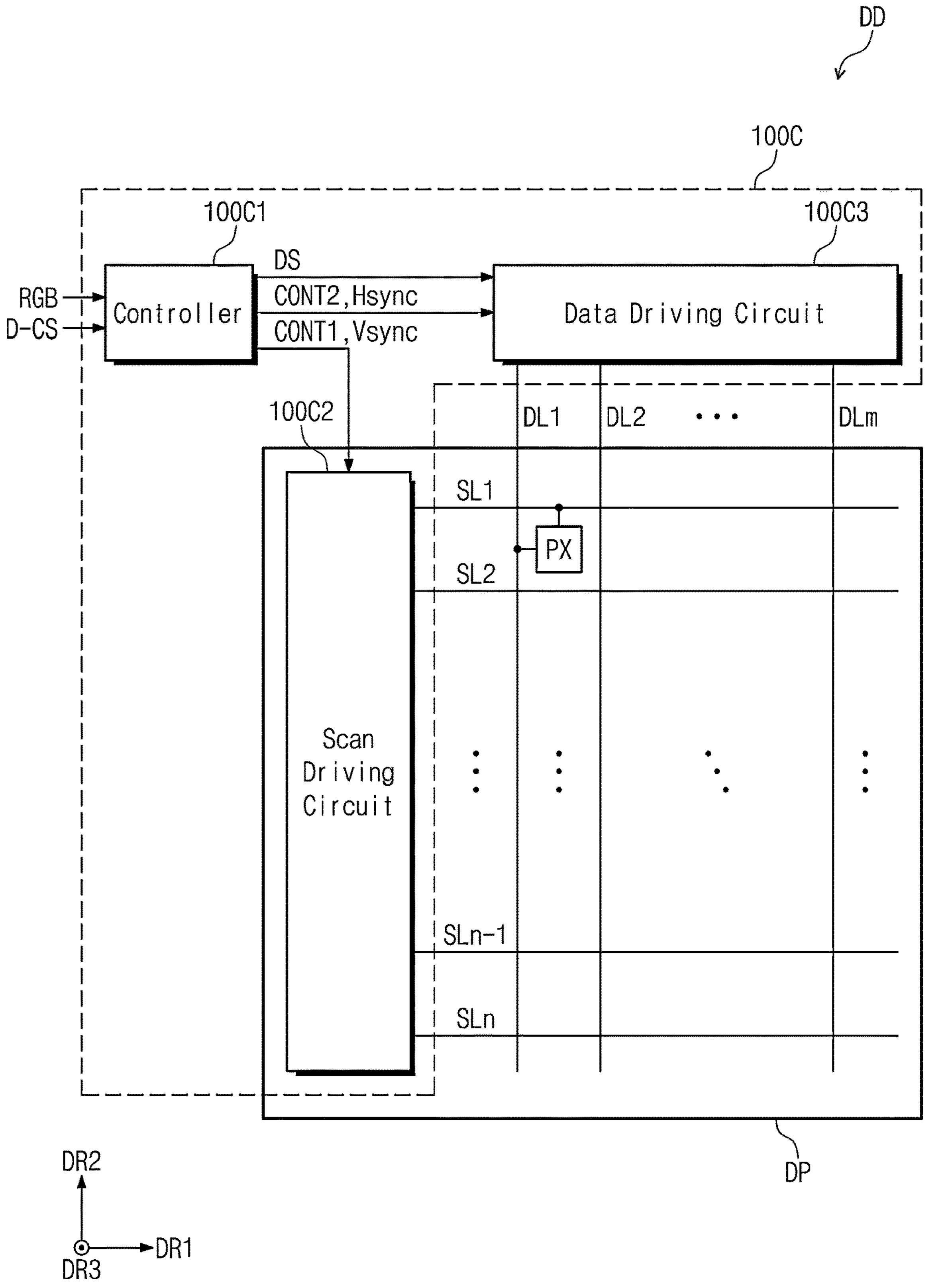
FIG. 3 is a block diagram of an embodiment of a display device, according to the present disclosure.

FIG. 3 is a block diagram of an embodiment of a display device DD, according to the present disclosure.

Referring to FIG. 3, the display panel DP may include a plurality of scan lines SL1 to SLn, a plurality of data lines DL1 to DLm, and a plurality of pixels PX. Each of the plurality of pixels PX is connected with a corresponding data line of the plurality of data lines DL1 to DLm and is connected with a corresponding scan line of the plurality of scan lines SL1 to SLn. Here, 'n' may be an integer greater than or equal to 2, and 'm' may be an integer greater than or equal to 2. In an embodiment of the present disclosure, the display panel DP may further include light emission control lines, and a display driver 100C may further include a light emission driving circuit that provides control signals to the light emission control lines. The configuration of the display panel DP is not particularly limited to the examples described herein.

Each of the scan lines SL1 to SLn may extend in the first direction DR1, and the scan lines SL1 to SLn may be arranged to be spaced apart from each other in the second direction DR2. Each of the data lines DL1 to DLm may extend in the second direction DR2, and the data lines DL1 to DLm may be arranged to be spaced apart from each other in the first direction DR1.

The display driver 100C may include a controller 100C1, a scan driving circuit 100C2, and a data driving circuit 100C3.

The controller 100C1 may receive image data RGB and a control signal D-CS from a main driver. The controller 100C1 may generate corrected image data RGBc (described with reference to FIG. 4) by correcting the image data RGB. The configuration and operation of the controller 100C1 generating the corrected image data RGBc by correcting the image data RGB will be described later herein.

The controller 100C1 generate a driving signal DS by converting the data format of the image data RGB or the corrected image data RGBc to meet the interface specification with the data driving circuit 100C3. As an example in accordance with the present disclosure, the controller 100C1 may generate the driving signal DS by converting the format of the image data RGB and the corrected image data RGBc to meet the interface specification with the data driving circuit 100C3 (e.g., such that the resulting format of the image data RGB and the corrected image data RGBc satisfies the interface specification of the data driving circuit 100C3).

The control signal D-CS may include an input vertical synchronization signal, an input horizontal synchronization signal, a main clock, and a data enable signal. The controller 100C1 may generate a first control signal CONT1 and a vertical synchronization signal Vsync based on the control signal D-CS, and may output the first control signal CONT1 and the vertical synchronization signal Vsync to the scan driving circuit 100C2. The controller 100C1 may generate a second control signal CONT2 and a horizontal synchronization signal Hsync based on the control signal D-CS, and may output the second control signal CONT2 and the horizontal synchronization signal Hsync to the data driving circuit 100C3. The first control signal CONT1 and the second control signal CONT2 are signals associated with (e.g., necessary for) the operation of the scan driving circuit 100C2 and the data driving circuit 100C3, and control signals associated with the operation of the scan driving circuit 100C2 and the data driving circuit 100C3 are not particularly limited thereto.

The controller 100C1 may output the driving signal DS obtained by processing the image data RGB or the corrected image data RGBc to meet an operating condition of the display panel DP to the data driving circuit 100C3. The scan driving circuit 100C2 drives the plurality of scan lines SL1 to SLn in response to the first control signal CONT1 and the vertical synchronization signal Vsync.

In an embodiment of the present disclosure, the scan driving circuit 100C2 may be embedded in the display panel DP. For example, the scan driving circuit 100C2 may be formed in the same process as transistors in the pixel PX, but is not limited thereto. For example, the scan driving circuit 100C2 may be implemented as an integrated circuit (IC) and may be directly mounted on a predetermined area of the display panel DP or may be mounted on a separate printed circuit board in a chip-on-film (COF) manner to be electrically connected with the display panel DP.

The data driving circuit 100C3 may output a grayscale voltage to the data lines DL1 to DLm in response to the second control signal CONT2, the horizontal synchronization signal Hsync, and the driving signal DS provided from the controller 100C1. The data driving circuit 100C3 may be included in the driving chips DIC (described with reference to FIG. 2). In detail, the data driving circuit 100C3 may be implemented as an integrated circuit and may be directly mounted on a predetermined area of the display panel DP or may be mounted on a separate printed circuit board in the chip-on-film manner to be electrically connected with the display panel DP, but the present disclosure is not limited thereto. For example, the data driving circuit 100C3 may be formed in the same process as the circuit layer in the display panel DP.

Figure 4:
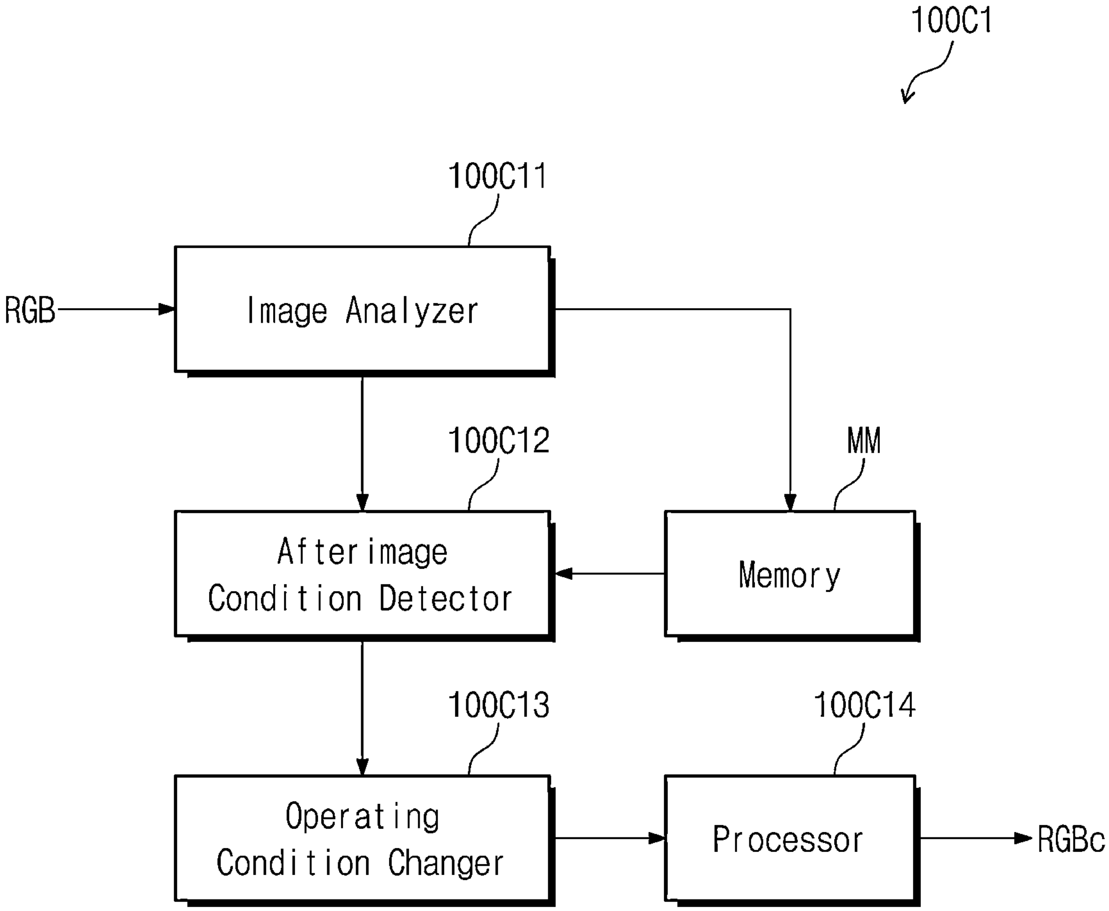
FIG. 4 is a block diagram of an embodiment of a controller, according to the present disclosure.
Figure 5:
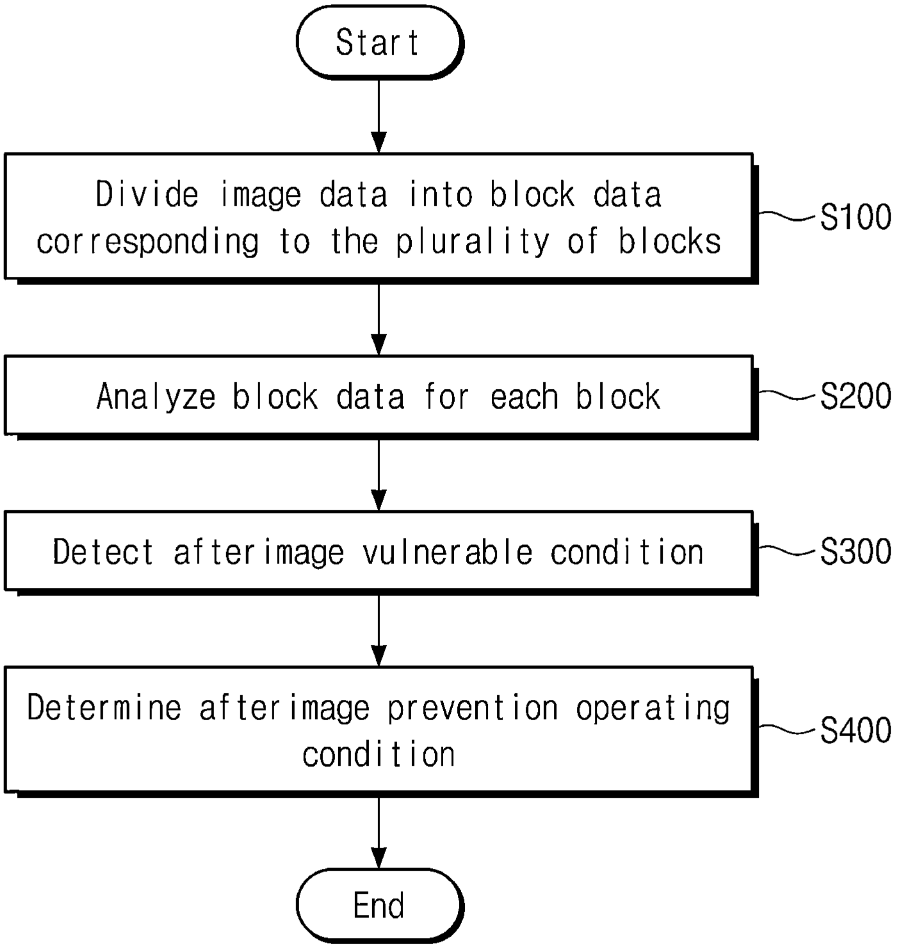
FIG. 5 is a flowchart illustrating an embodiment of a method of driving a display device, according to the present disclosure.

FIG. 4 is a block diagram of an embodiment of the controller 100C1, according to the present disclosure. FIG. 5 is a flowchart illustrating an embodiment of a driving method of a display device DD (described with reference to FIG. 1), according to the present disclosure.

Referring to FIG. 4, the controller 100C1 may divide the image data RGB to correspond to a plurality of blocks, and the controller 100C1 may determine whether the image data RGB is a fixed image based on an inter-frame variation of one or more blocks of the plurality of blocks. For example, the controller 100C1 may determine whether the image data RGB is a fixed image based on an inter-frame variation of two or more blocks of the plurality of blocks, an inter-frame variation of each of the plurality of blocks, or the like. In an example of dividing the image data RGB into blocks, the blocks may correspond to divided regions of the display panel DP. Each of the blocks may correspond to data of the pixels in the corresponding divided region. In detail, the controller 100C1 may be configured to change an afterimage prevention operation mode when the number of blocks displaying the fixed image for a period equal to or greater than a first reference value among the plurality of blocks is equal to or greater than a second reference value. In an example, the second reference value may be a threshold number of blocks.

The term "afterimage condition" may refer to a condition in which an image is displayed that has the potential to cause burn-in of light emitting elements. For example, if a fixed still image is displayed for a long period of time, the light emitting elements of the pixels corresponding to that area may be burned in, causing an afterimage or a mura. The terms "period," "temporal period," "time period," "temporal duration," and "duration" may be used interchangeably herein. Example aspects of changing an afterimage prevention operation mode in accordance with aspects of the present disclosure will be described in detail below.

The controller 100C1 may include an image analyzer 100C11, an afterimage condition detector 100C12, an operating condition changer 100C13, and a processor 100C14. In an embodiment of the present disclosure, the controller 100C1 may further include a memory MM. Alternatively, the memory MM may be provided outside of and be electrically coupled to the controller 100C1.

Referring to FIGS. 4 and 5, the image analyzer 100C11 receives the image data RGB and divides the image data RGB into block data corresponding to a plurality of blocks (S100). The image analyzer 100C11 may analyze block data for each block (S200). For example, the image analyzer 100C11 may obtain first block image information of each of a plurality of blocks of a first frame and second block image information of each of the plurality of blocks of a second frame subsequent to the first frame. The block image information may include, per block, at least one of average luminance, average grayscale, and data on a detected edge. Expressed another way, at S100, the image analyzer 100C11 may divide image data RGB associated with a first frame into first block data, and the first block data may include first block information respective to each of a plurality of blocks. The image analyzer 100C11 may further divide image data RGB associated with a second frame (a subsequent frame or a prior frame) into second block data, and the second block data may include second block information respective to each of a second plurality of blocks.

The block image information obtained by the image analyzer 100C11 may be stored in the memory MM. According to an embodiment of the present disclosure, the block image information for each of the blocks may be stored in the memory MM. Therefore, compared to the case where all information of a frame is stored, the amount of data may be reduced and the processing speed in subsequent operations may be improved. However, the present disclosure is not limited thereto. For example, entire information of a frame may be stored in the memory MM.

The afterimage condition detector 100C12 may detect an afterimage vulnerable condition (S300). The afterimage condition detector 100C12 may determine whether the image is an afterimage vulnerable image in a use environment lasting several minutes or more. A detailed description of the afterimage vulnerable condition detection operation of the afterimage condition detector 100C12 will be described later herein.

The operating condition changer 100C13 may determine an afterimage prevention operating condition depending on the result detected by the afterimage condition detector 100C12 (S400). For example, the operating condition changer 100C13 may deactivate the afterimage prevention operation. In some aspects, deactivating the afterimage prevention operation may include changing an afterimage prevention operation mode from a first operation mode to a second operation mode different from the first operation mode. Therefore, when the display device DD (described with reference to FIG. 1) is driven under conditions vulnerable to afterimages, the lifespan of the display panel DP (described with reference to FIG. 2) may be improved by applying an afterimage prevention operation more strongly (e.g., by strengthening compensation operations associated with the afterimage prevention operation as described herein).

The processor 100C14 may output the corrected image data RGBc obtained by correcting the image data RGB based on the determined operation mode (e.g., based on whether the afterimage prevention operation is activated or deactivated).

Figure 6:
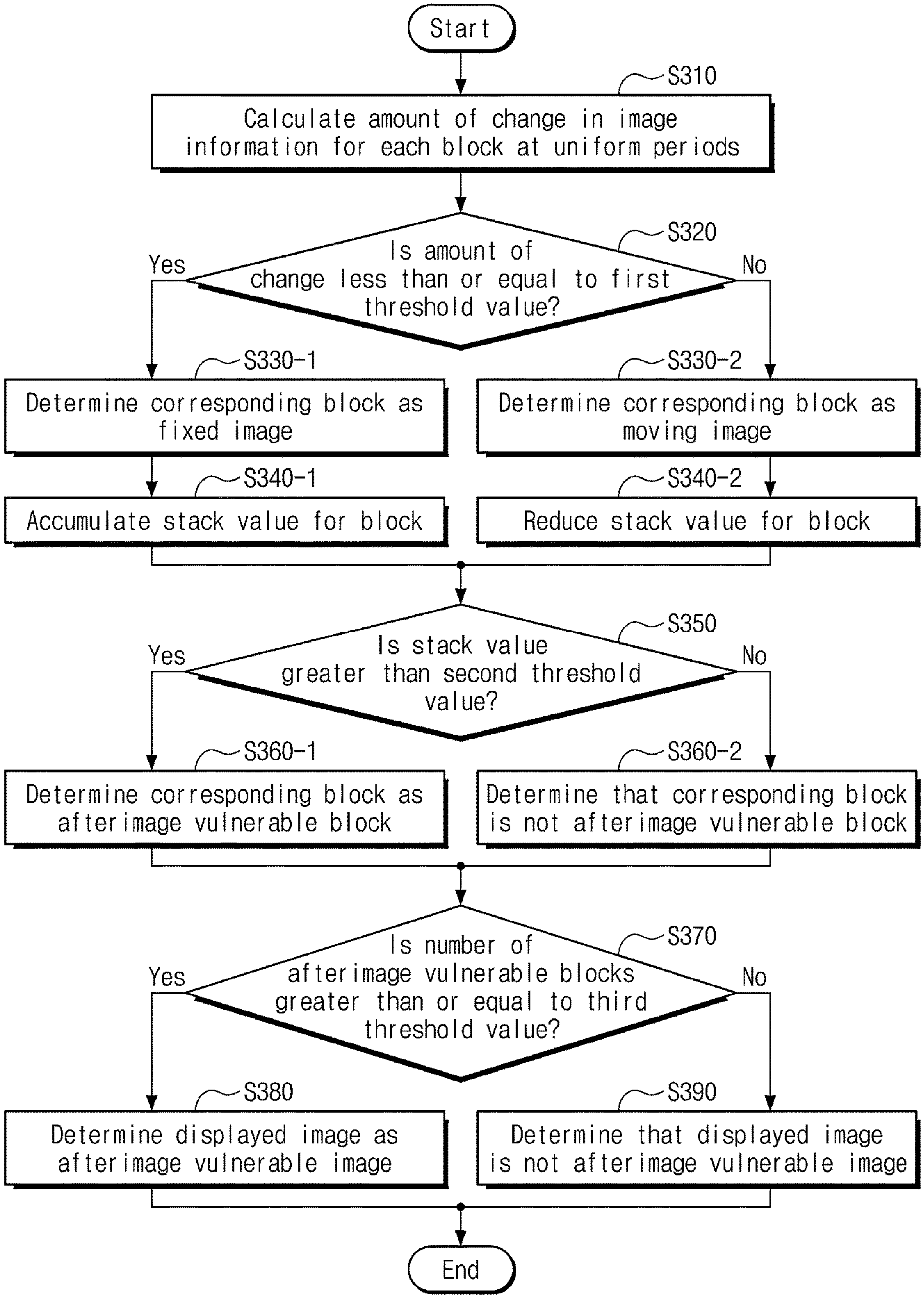
FIG. 6 is a flowchart illustrating an embodiment of a method of driving a display device, according to the present disclosure.

FIG. 6 is a flowchart illustrating an embodiment of a driving method of the display device DD, according to the present disclosure.

Referring to FIGS. 4 and 6, the afterimage condition detector 100C12 calculates the amount of change in image information for each block at uniform periods (S310) (e.g., according to a determined temporal interval). The afterimage condition detector 100C12 may calculate a change amount for detecting the afterimage condition over a predetermined time period, instead of detecting the afterimage condition based on successive previous and subsequent frames or a frame. Expressed another way, the afterimage condition detector 100C12 may calculate a change amount based on different frames included in a predetermined time period, and the different frames may be sequential or non-sequential. Accordingly, for example, the controller 100C1 may further strengthen the compensation operation when the afterimage vulnerable image is displayed for a predetermined period or more. The predetermined period may be several minutes or more and several hours or less, for example, 5 minutes. Expressed another way, the controller 100C1 may strengthen the compensation operation for cases in which the afterimage vulnerable image is present for a temporal period greater than a threshold temporal period (e.g., 5 minutes, 5 hours, or the like). Example aspects of strengthening the compensation operation are later described herein. Aspects of the present disclosure related to the predetermined period based on which to strengthen the compensation operation are not limited to the examples described herein.

The afterimage condition detector 100C12 determines whether an amount of change is less than or equal to a first threshold value (S320). When the amount of change is less than or equal to the first threshold, the corresponding block (hereinafter, referred to as a first block) is determined as a fixed image (S330-1), and when the amount of change exceeds the first threshold, the corresponding block (hereinafter, referred to as a second block) is determined as a moving image (S330-2). Expressed another way, when the afterimage condition detector 100C12 determines the amount of change of a given block is less than or equal to the first threshold, the afterimage condition detector 100C12 determines (at S330-1) that the given block is associated with a fixed image. Further, for example, when the afterimage condition detector 100C12 determines the amount of change of a given block is greater than the first threshold, the afterimage condition detector 100C12 determines (at S330-2) that the given block is associated with a moving image. The terms “fixed image,” “static image,” and “unchanged image” may be used interchangeably herein. The terms “moving image” and “changed image” may be used interchangeably herein.

A first stack value of the first block determined as the fixed image may be accumulated (S340-1), and a second stack value of the second block determined as the moving image may be reduced (S340-2). For example, when the first block is in a first state (or displaying the fixed image), the afterimage condition detector 100C12 may accumulate a first value to the first stack value corresponding to the first block, and when the first block is in a second state (or displaying the moving image), the afterimage condition detector 100C12 may subtract a second value from the second stack value.

In an embodiment of the present disclosure, the first value may be equally increased whenever the corresponding block is determined to be the fixed image without a weight. Alternatively, in an embodiment of the present disclosure, the first value may be a value to which a weight is applied based on data on the luminance or edge of the first block determined to be the fixed image. For example, a greater weight may be applied as the luminance is higher or the data value of the edge is larger. Expressed another way, for a block determined to be in a first state (e.g., the block is associated with a fixed image), the afterimage condition detector 100C12 may add a first value associated with the block to the first stack value, without applying a weighting factor to the first value. Additionally, or alternatively, for the block determined to be in the first state (e.g., the block is associated with a fixed image), the afterimage condition detector 100C12 may apply a weighting factor to the first value, and the afterimage condition detector 100C12 may increase or decrease the weighting factor based on the luminance or edge of the block.

In an embodiment of the present disclosure, when the afterimage condition detector 100C12 determines that a block that was displaying a fixed image is determined to change state to display a moving image, the stack value may be farther from a reference value (e.g., a second threshold value) associated with an afterimage vulnerable block. The first value accumulated to a stack value and the second value subtracted from a stack value may be the same, but are not particularly limited thereto. In an embodiment of the present disclosure, the second stack value of the second block determined as the moving image may be initialized to "0", and the stack value may be decreased in various ways away from the second threshold.

The afterimage condition detector 100C12 compares the stack value with the second threshold value (S350). When the stack value exceeds the second threshold value, the corresponding block may be determined to be an afterimage vulnerable block (S360-1), and when the stack value is less than the second threshold value, the corresponding block may be determined not to be an afterimage vulnerable block (S360-2). The second threshold value may be referred to as a threshold stack value. Expressed another way, when the afterimage condition detector 100C12 determines the stack value of a given block exceeds the second threshold value (threshold stack value), the afterimage condition detector 100C12 determines (at S360-1) that the given block is an afterimage vulnerable block. Further, for example, when the afterimage condition detector 100C12 determines the stack value of a given block does not exceed the second threshold value, the afterimage condition detector 100C12 determines (at S360-2) that the given block is not an afterimage vulnerable block.

When it is assumed that the stack value is accumulated by '1' when the first block is determined to be the fixed image, the second threshold value has a value of '10'. Expressed another way, in an example, the afterimage condition detector 100C12 may add a value of '1' to the stack value when the afterimage condition detector 100C12 determines the first block is associated with a fixed image. In this case, when the afterimage condition detector 100C12 determines that the fixed image is continuously displayed at the first block for a time period exceeding 10 times a specified time period for calculating the amount of change, the afterimage condition detector 100C12 determines the first block to be an afterimage vulnerable block. The aforementioned second threshold value is an example, and is not necessarily limited thereto. In some aspects, when a weight is applied to the accumulated value (e.g., the value of '1'), a block displaying a fixed image that is more vulnerable to an afterimage may be more quickly determined by the afterimage condition detector 100C12 as an afterimage vulnerable block. For example, in the case of a block to which a weight of 2 is applied under the same conditions described herein, the afterimage condition detector 100C12 may determine the block to be an afterimage vulnerable block about twice as fast compared to a case in which a weight is not applied.

The afterimage condition detector 100C12 compares the number of afterimage vulnerable blocks with a third threshold value (S370). In an example, the third threshold value may be a threshold number of afterimage vulnerable blocks. When the number of afterimage vulnerable blocks is equal to or greater than the third threshold value, the afterimage condition detector 100C12 may determine that the image displayed on the display device DD (described with reference to FIG. 1) is an afterimage vulnerable image (S380). When the number of afterimage vulnerable blocks is equal to or less than the third threshold value, the afterimage condition detector 100C12 may determine that the image displayed on the display device DD (described with reference to FIG. 1) is not an afterimage vulnerable image (S390). In an example, the third threshold value (threshold number of afterimage vulnerable blocks) may be half of the total number of blocks, but is not particularly limited thereto.

Figures 7, 8A, 8B:
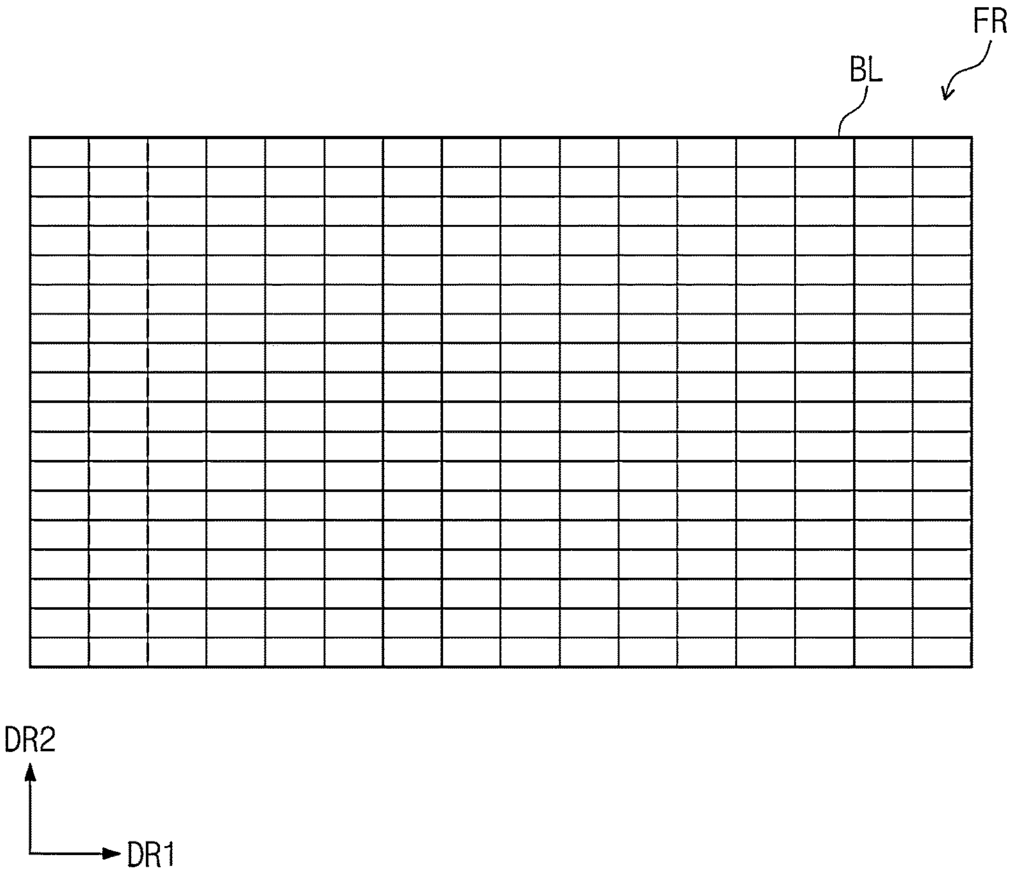
FIG. 7 is a diagram for describing an embodiment of a method of driving a display device, according to the present disclosure.
FIG. 8A is a diagram illustrating an embodiment of an edge filter, according to the present disclosure.
FIG. 8B is a diagram illustrating an embodiment of an edge filter, according to the present disclosure.
Figure 9:
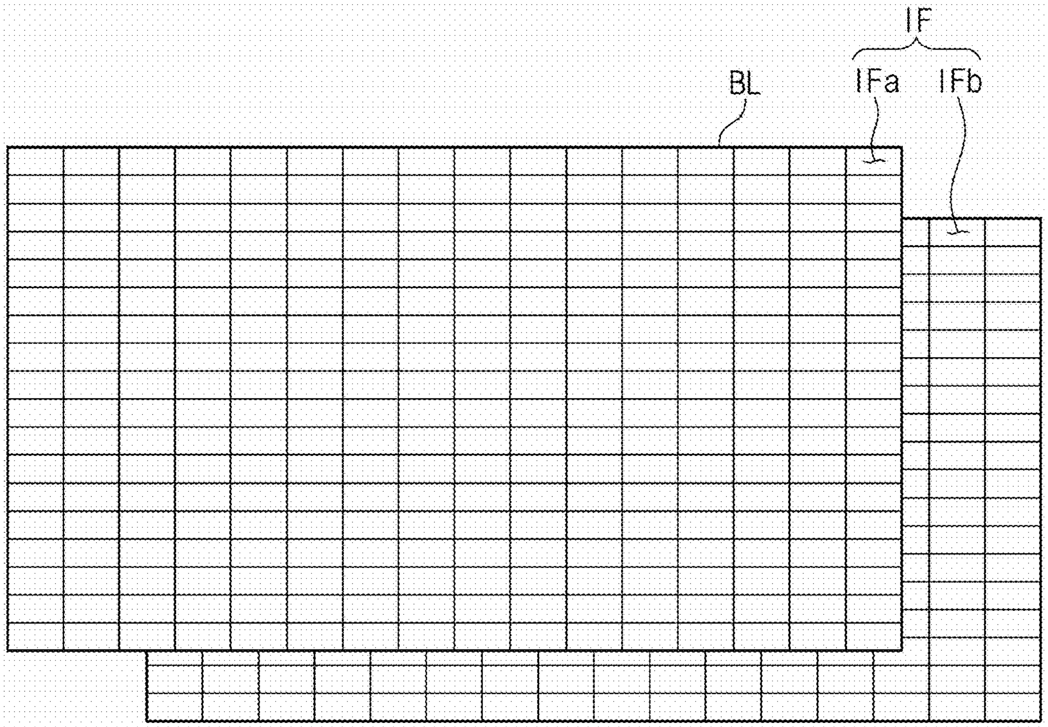
FIG. 9 is a diagram for describing an embodiment of a method of driving a display device, according to the present disclosure.

FIG. 7 is a diagram for describing an embodiment of a driving method of the display device DD, according to the present disclosure. FIG. 8A is an embodiment of an edge filter EF1, according to the present disclosure. FIG. 8B is an embodiment of an edge filter EF2, according to the present disclosure. FIG. 9 is a diagram for describing an embodiment of a driving method of the display device DD, according to the present disclosure.

Referring to FIGS. 4 and 7, the image analyzer 100C11 may divide the image data RGB corresponding to a frame FR into a plurality of blocks BL. FIG. 7 illustrates, for example, that frame FR is divided into 16 blocks in the first direction DR1 and 18 blocks in the second direction DR2, for a total of 288 blocks BL. However, the present disclosure is not limited thereto. The number of blocks BL may be variously changed.

Referring to FIGS. 8A and 8B, the edge filters EF1 and EF2 for detecting an edge of each of the blocks BL are illustratively illustrated. An edge may refer to a portion of an image in which brightness of pixels included in the portion rapidly changes (e.g., the change in rate of the change in brightness is greater than a threshold value), and the edge may be a boundary between a background of the image and an object included in the image, or the edge may be a boundary between objects. For example, the edge may be a boundary between a background and a logo, or a boundary between a background and a fixed status window.

Referring to FIGS. 4, 7, 8A, 8B, and 9, the image analyzer 100C11 may obtain block image information IF of each of the blocks BL. The block image information IF may include first image information IFa and second image information IFb. For example, the first image information IFa may include average luminance information or average grayscale information, and the second image information IFb may include edge data.

The image data RGB may be input based on corresponding grayscale values (e.g., the average value of R, G, and B at a given block BL may be converted to a grayscale value). In an embodiment of the present disclosure, the first image information IFa may include an average grayscale value for each of the blocks BL, and the second image information IFb may include edge data with respect to each of the blocks BL calculated based on the grayscale values. The term "average grayscale" for a block BL may refer to the arithmetic mean of respective grayscale values of the pixels in the block BL. Alternatively or additionally, in an embodiment of the present disclosure, the image analyzer 100C11 may obtain the block image information IF of a block based on the luminance of the block after converting the grayscale value of the block into the luminance. For example, the first image information IFa may include an average luminance value for each of the blocks BL, and the second image information IFb may include the edge data with respect to each of the blocks BL calculated based on the luminance. The term "average luminance" for a block BL may refer to the arithmetic mean of respective luminance of the pixels in the block BL.

Figure 10:
FIG. 10 is a diagram illustrating an embodiment of a use state of a display device, according to the present disclosure.

FIG. 10 is a diagram illustrating an embodiment of a use state of the display device DD (described with reference to FIG. 1), according to the present disclosure.

Referring to FIGS. 1, 3, and 10, an image IMex displayed on the display device DD includes a first part IM1, second parts IM2*a* and IM2*b*, and third parts IM3*a* and IM3*b*. The first part IM1 may be a part where a moving image is displayed, the second parts IM2*a* and IM2*b* may be a part where information, comments, or thumbnails of other contents related to the moving image are displayed, and the third parts IM3*a* and IM3*b* may be a part where a still image (or the same image) such as, for example, a user interface is displayed. The terms "part" of an image and "portion" of an image may be used interchangeably herein.

When the image IMex having a similar form to that illustrated in FIG. 10 is continuously displayed on the display device DD, a portion of the display panel DP for displaying the second parts IM2*a* and IM2*b* and the third parts IM3*a* and IM3*b* may be relatively vulnerable to afterimages compared to other portions of the display panel DP displaying the first part IM1.

According to an embodiment of the present disclosure, when the same image is continuously displayed on the display device DD (e.g., a similar type of image is continuously displayed), the controller 100C1 may determine whether the image IMex is vulnerable to afterimage and may determine an afterimage prevention operation mode. For example, when the controller 100C1 determines that the image IMex is vulnerable to afterimage, an afterimage prevention compensation operation may be further strengthened. Thus, the lifespan of the display panel DP (described with reference to FIG. 2) may be further improved. In addition, since the compensation operation is reinforced in an environment in which blocks of a predetermined ratio or more display a fixed image for more than several minutes, the possibility of deterioration in image quality, for example, occurrence of artifacts, may be reduced.

Figure 11A:
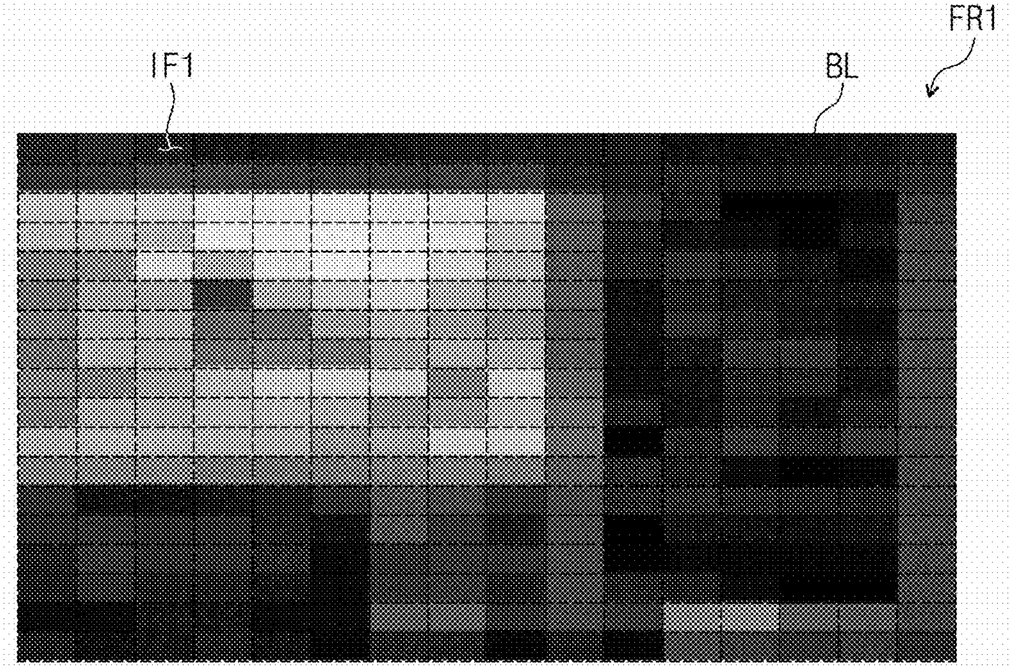
FIG. 11A is a diagram illustrating an average luminance for each block of a first frame, according to an embodiment of the present disclosure.
Figure 11B:
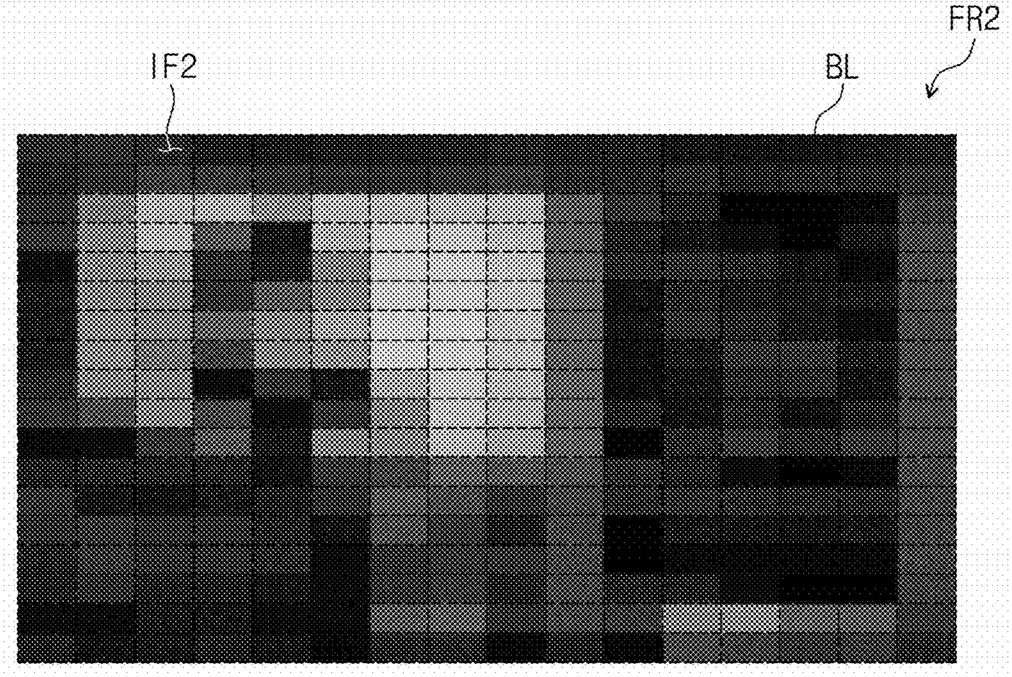
FIG. 11B is a diagram illustrating an average luminance for each block of a second frame, according to an embodiment of the present disclosure.
Figure 11C:
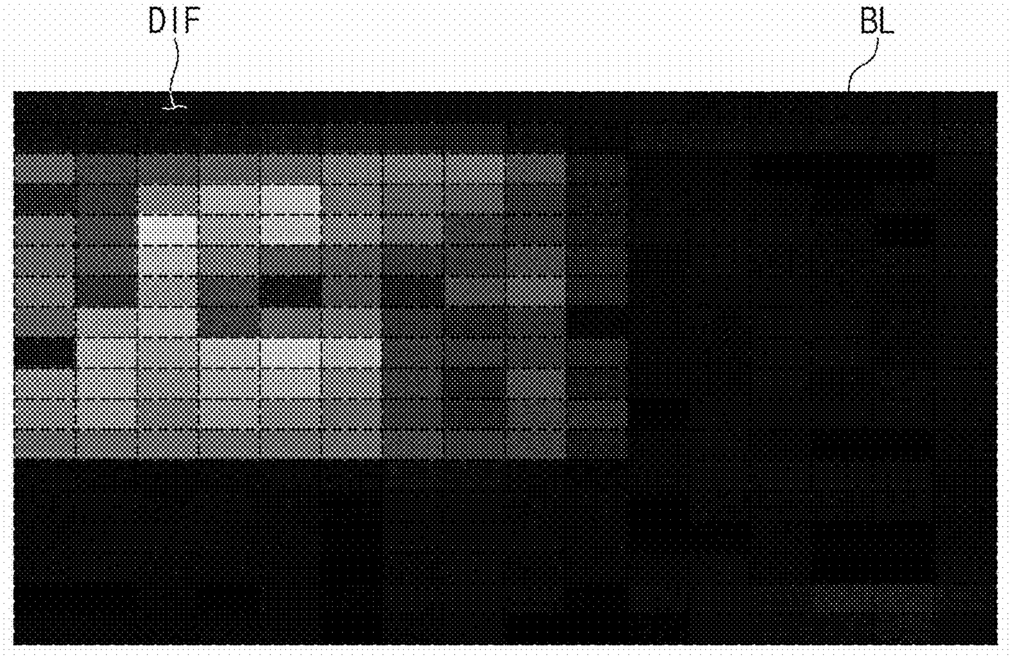
FIG. 11C is a diagram illustrating an average luminance difference for each block between a first frame and a second frame, according to an embodiment of the present disclosure.

FIG. 11A is a diagram illustrating an average luminance for each block BL of a first frame FR1, according to an embodiment of the present disclosure. FIG. 11B is a diagram illustrating an average luminance for each block BL of a second frame FR2, according to an embodiment of the present disclosure. FIG. 11C is a diagram illustrating an average luminance difference for each block BL between a first frame FR1 and a second frame FR2, according to an embodiment of the present disclosure.

Referring to FIGS. 4, 11A, and 11B, the image analyzer 100C11 may calculate average luminance (or grayscale) information for each block BL of the first frame FR1 and may calculate average luminance (or grayscale) information for each block BL of the second frame FR2. The interval (e.g., temporal interval) between the first frame FR1 and the second frame FR2 may be several minutes or more and several hours or less. For example, the interval between the first frame FR1 and the second frame FR2 may be 5 minutes.

Referring to FIG. 11C, the afterimage condition detector 100C12 may calculate a difference DIF between first block image information IF1 of each of the blocks BL of the first frame FR1 and second block image information IF2 of each of the blocks BL of the second frame FR2. In FIG. 11C, for a block BL displayed as darker, the difference DIF may be closer to '0', and when the difference DIF is close to '0', the probability of the block BL displaying a fixed image is high.

The afterimage condition detector 100C12 may determine that a block BL is in the first state when the difference DIF is less than a reference difference value or when a ratio of the difference DIF (example aspects of which are later described herein) is less than or equal to a state reference value, and the afterimage condition detector 100C12 may determine that the block BL is in the second state when the difference DIF exceeds the reference difference value or when the ratio of the difference DIF exceeds the state reference value. The first state may be a state of displaying a fixed image, and the second state may be a state of displaying a moving image.

In an embodiment of the present disclosure, the difference DIF may include a first difference between the average luminance (or average grayscale) of a block BL in the second frame FR2 and the average luminance (or average grayscale) of the block BL in the first frame FR1, and the difference DIF may include a second difference between the edge data of the block BL of the second frame FR2 and the edge data of the block BL of the first frame FR1. The ratio of the difference DIF may be the percentage of the first difference with respect to the average luminance (or average grayscale) of a block of the second frame FR2 and may be the percentage of the second difference with respect to the edge data of a block of the second frame FR2. The condition reference value may be, for example, 5 percent. However, the described condition reference value is an example and is not particularly limited thereto. The condition reference value may correspond to the first threshold value described with reference to FIG. 6.

Figure 12A:
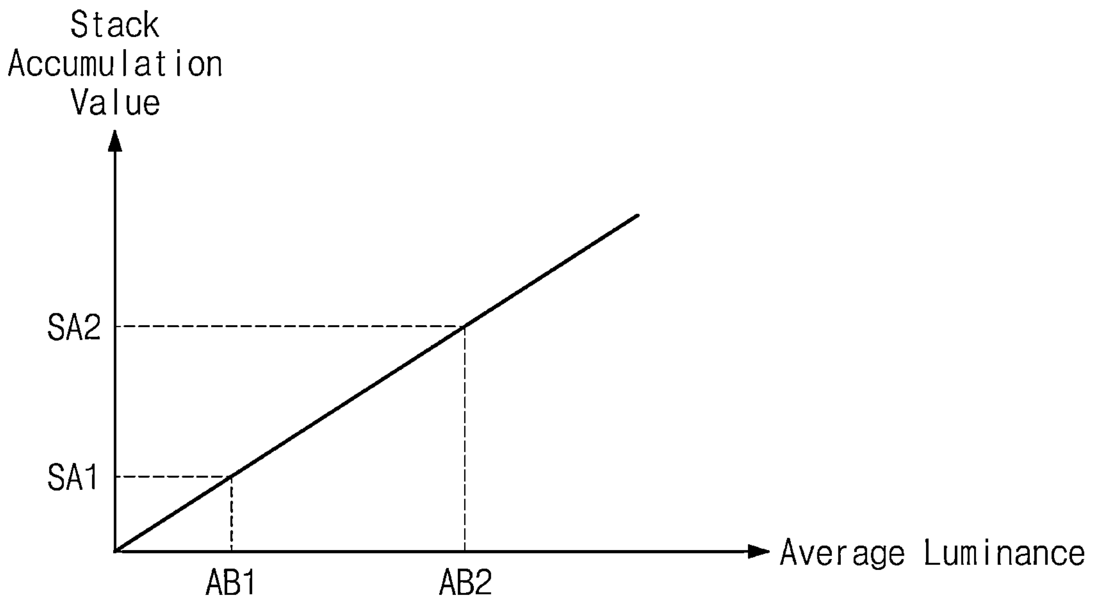
FIG. 12A is a graph illustrating a stack accumulation value according to an average luminance, according to an embodiment of the present disclosure.
Figure 12B:
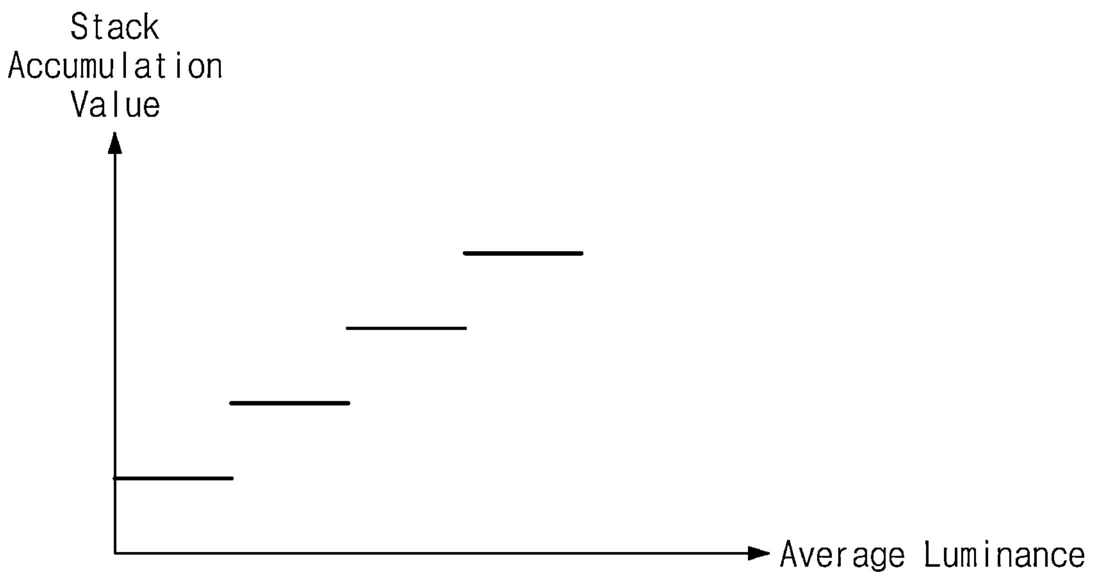
FIG. 12B is a graph illustrating a stack accumulation value according to an average luminance, according to an embodiment of the present disclosure.

FIG. 12A is a graph illustrating a stack accumulation value according to an average luminance, according to an embodiment of the present disclosure. FIG. 12B is a graph illustrating a stack accumulation value according to an average luminance, according to an embodiment of the present disclosure.

Referring to FIGS. 4, 6, 12A, and 12B, the first stack value of a first block determined as a fixed image may be accumulated (S340-1) (e.g., a first value may be added to the first stack value as described herein), and the second stack value of a second block determined as a moving image may be reduced (S340-2) (e.g., a second value may be subtracted from the second stack value as described herein). For example, when the first block is in the first state (or displaying a fixed image), the first value may be accumulated to the first stack value corresponding to the first block. In an embodiment of the present disclosure, a weight may be applied to the first value based on the average luminance or the edge data of the first block determined as a fixed image.

In FIGS. 12A and 12B, a stack accumulation value for average luminance is representatively described, but a weight may be applied based on the average grayscale or the edge data. When a weight is applied to the stack accumulation value, a block displaying a fixed image that is more vulnerable to afterimage may be more quickly determined as an afterimage vulnerable block.

Referring to FIG. 12A, a first stack accumulation value SA1 when the average luminance is a first average luminance AB1 may be less than a second stack accumulation value SA2 when the average luminance is a second average luminance AB2 higher than the first average luminance AB1. Although FIG. 12A illustrates an example in which the stack accumulation value increases linearly according to the average luminance, the present disclosure is not particularly limited thereto. For example, the stack accumulation value may non-linearly increase according to the average luminance.

Referring to FIG. 12B, the average luminance is divided into a plurality of sections, and a stack accumulation value corresponding to each of the plurality of sections may be applied as a first value. Even in this case, the stack accumulation value may increase in accordance with increases in the average luminance.

Figure 13:
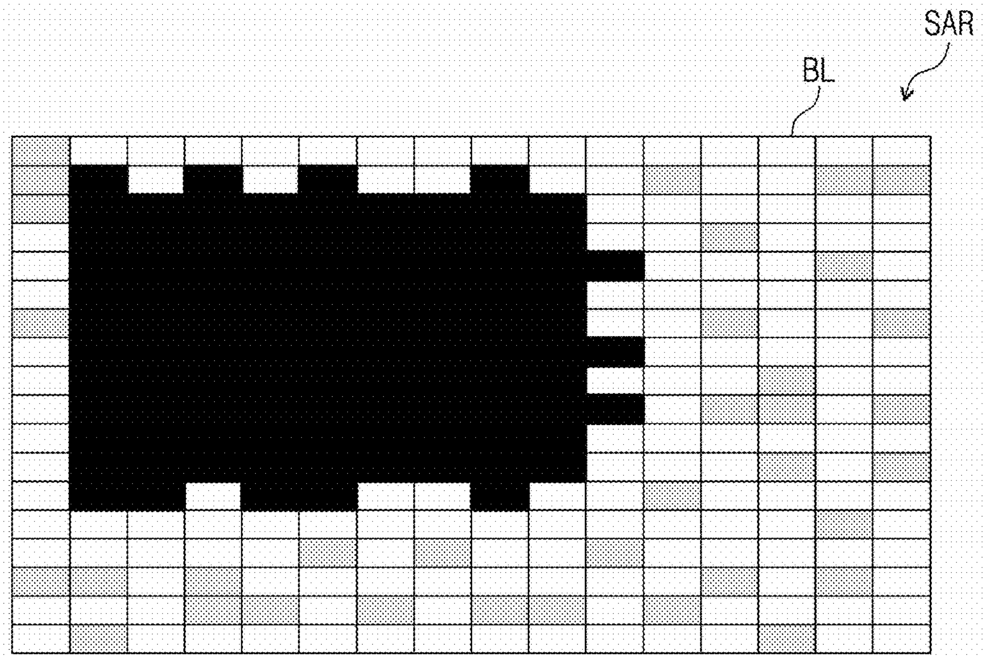
FIG. 13 is a diagram illustrating a stack accumulation result for each block, according to an embodiment of the present disclosure.

FIG. 13 is a diagram illustrating a stack accumulation result SAR for each block BL, according to an embodiment of the present disclosure.

Referring to FIGS. 4, 10, and 13, it may be understood that, in a stack accumulation result SAR associated with the plurality of blocks BL, as the shade displayed on the plurality of blocks BL increases (e.g., the plurality of blocks BL are darker), the stack values of the blocks BL is greater. For example, since the first part IM1 corresponds to a part displaying a moving image, in the stack accumulation result SAR associated with the plurality of blocks BL, the blocks BL corresponding to the first part IM1 are displayed as the darkest, and the blocks BL corresponding to the second parts IM2*a* and IM2*b* and the third portions IM3*a* and IM3*b* may be displayed relatively brighter than the blocks BL corresponding to the first part IM1. The stack accumulation result SAR may also be referred to herein as an accumulated result of the stack values of the BLs.

As described herein, for a given block BL, the afterimage condition detector 100C12 may compare the stack value of the block BL with the second threshold value, and when the stack value is greater than or equal to the second threshold value (threshold stack value described herein), the afterimage condition detector 100C12 may determine the corresponding block to be an afterimage vulnerable block.

Figure 14:
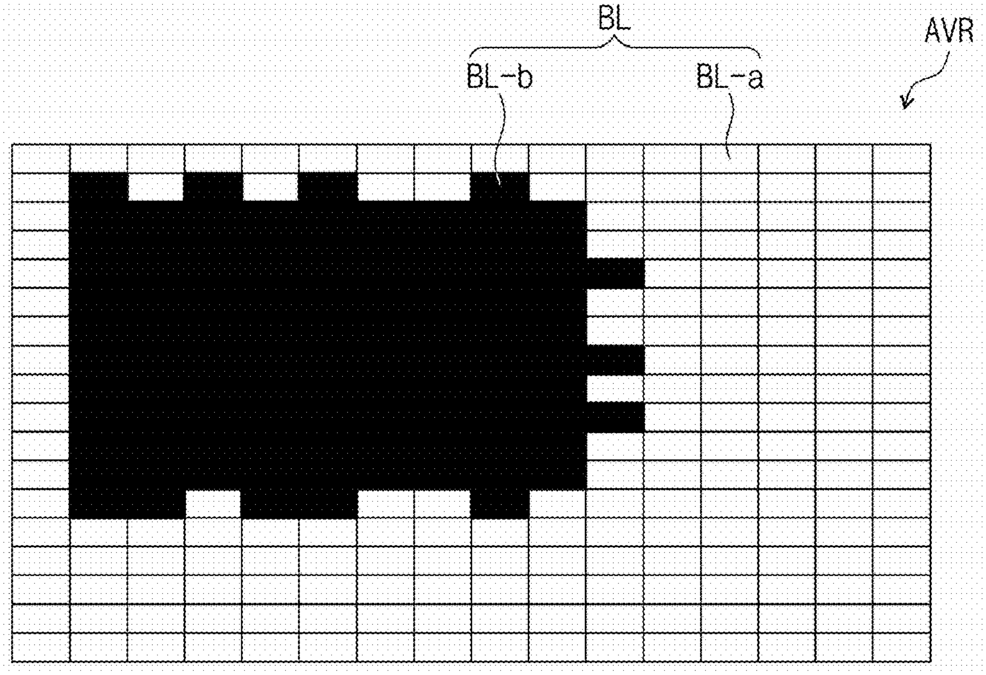
FIG. 14 is a diagram illustrating a determination result of an afterimage vulnerable block, according to an embodiment of the present disclosure.

FIG. 14 is a diagram illustrating a determination result AVR of an afterimage vulnerable block, according to an embodiment of the present disclosure.

Referring to FIG. 14, blocks BL-a determined to be afterimage vulnerable blocks are displayed relatively bright, and blocks BL-b determined not to be afterimage vulnerable blocks are displayed relatively dark. The afterimage condition detector 100C12 may compare the number of blocks BL-a determined to be an afterimage vulnerable block (from among all blocks BL) to the third threshold value (threshold number of afterimage vulnerable blocks) described herein. When the number of blocks BL-a determined to be an afterimage vulnerable block is greater than or equal to the third threshold value (threshold number of afterimage vulnerable blocks), the afterimage condition detector 100C12 may determine that the image corresponding to the blocks BL is an afterimage vulnerable image. In an example, the third threshold value may be 133, which is half of the total number of blocks BL, but is not particularly limited thereto.

Figure 15:
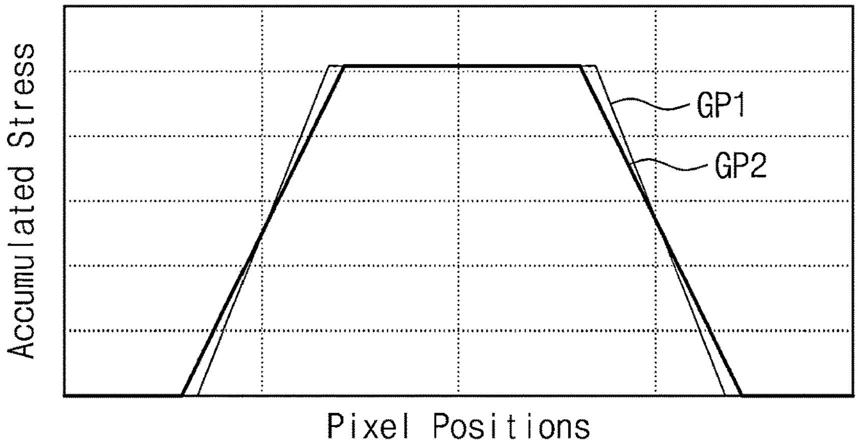
FIG. 15 is a graph for describing an embodiment of an afterimage compensation operation, according to the present disclosure.

FIG. 15 is a graph for describing an embodiment of an afterimage compensation operation, according to the present disclosure.

Referring to FIGS. 3 and 15, when an image displayed on the display panel DP is determined to be an afterimage vulnerable image, the controller 100C1 may change an afterimage prevention compensation operation from a first operation mode to a second operation mode.

For example, the controller 100C1 moves the image data RGB by 'X' number of pixels in a first period in the first operation mode and displays the image data RGB on the display panel DP. In addition, the controller 100C1 moves the image data RGB by 'Y' number of pixels in a second period in the second operation mode and displays the image data RGB on the display panel DP. Expressed another way, in the first operation mode and the second operation mode, the controller 100C1 may position the image data RGB according to pixel positions different from initial pixel positions associated with the image data RGB. In an example, the 'Y' number may be greater than or equal to the 'X' number. In some examples, the second period may be less than or equal to the first period.

In an example, the amount by which the image is shifted in the second operation mode may be greater than the amount by which the image is shifted in the first operation mode. Expressed another way, the amount by which the controller 100C1 moves the image data RGB may be greater in the second operation mode than in the first operation mode. In some examples, the period in which the image shifting operation occurs in the second operation mode may be equal to or less than the period in which the image shifting operation occurs in the first operation mode. Alternatively, the period in which the image shifting operation occurs in the second operation mode may be shorter than the period in which the image shifting operation occurs in the first operation mode, and the amount by which the image is shifted in the second operation mode may be equal to or greater than the amount by which the image is shifted in the first operation mode. In detail, the amount of compensation provided by the afterimage prevention compensation operation may be greater in the second operation mode than in the first operation mode.

A first graph GP1 is a graph of accumulated stress according to pixel positions when X is ±16 (e.g., when the controller 100C1 moves the image data RGB by 'X' number of pixels in a first period in the first operation mode), and a second graph GP2 is a graph of accumulated stress according to pixel positions when Y is ±20 (e.g., when the controller 100C1 moves the image data RGB by 'Y' number of pixels in a second period in the second operation mode). In this case, under a condition in which the accumulated stress is highest for the first graph GP1 and the second graph GP2, the width of the second graph GP2 is smaller than the width of the first graph GP1. Expressed another way, the second graph GP2 may have a smaller width than the first graph GP1 in the width of a portion receiving the maximum accumulated stress. Therefore, when the display device DD (described with reference to FIG. 1) is driven under conditions vulnerable to afterimages, the lifespan of the display panel DP (described with reference to FIG. 2) may be improved by applying an afterimage prevention operation more strongly (e.g., by strengthening compensation operations associated with the afterimage prevention operation as described herein).

Figure 16:
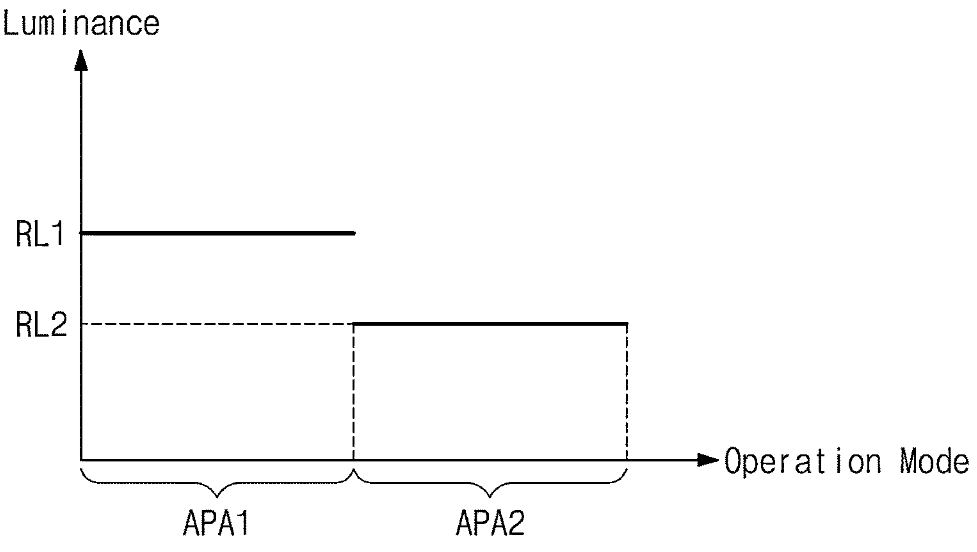
FIG. 16 is a graph for describing an embodiment of an afterimage compensation operation, according to the present disclosure.

FIG. 16 is a graph for describing an embodiment of an afterimage compensation operation, according to the present disclosure.

Referring to FIGS. 3 and 16, when the controller 100C1 determines an image displayed on the display panel DP is an afterimage vulnerable image, the controller 100C1 may change an afterimage prevention compensation operation from a first operation mode APA1 to a second operation mode APA2. When the controller 100C1 determines the luminance of the image data RGB is equal to or greater than a first reference luminance RL1 in the first operation mode APA1, the controller 100C1 may reduce the luminance by a first ratio (e.g., a first percentage). When the controller 100C1 determines the luminance of the image data RGB is equal to or greater than a second reference luminance RL2 in the second operation mode APA2, the controller 100C1 may reduce the luminance by a second ratio (e.g., a second percentage). The first reference luminance RL1 may be greater than or equal to the second reference luminance RL2, and the second ratio may be greater than or equal to the first ratio. In detail, the afterimage prevention compensation operation may be stronger in the second operation mode APA2 than in the first operation mode APA1. Expressed another way, the amount of compensation for reducing luminance in association with the afterimage prevention operations may be larger in the second operation mode APA2 than in the first operation mode APA1.

In an example of strengthening the afterimage prevention compensation operation, the luminance processing criteria may be lowered or the luminance processing ratio may be increased. Accordingly, when similar type of images are continuously input and the controller 100C1 changes the afterimage prevention compensation operation from the first operation mode APA1 to the second operation mode APA2, the area to be processed for luminance may be increased or the level to be processed for luminance may be increased.

According to an embodiment of the present disclosure, when an image of a similar type is continuously displayed (expressed another way, at least a portion of the same image is continuously displayed), the controller may determine whether the image is vulnerable to afterimages and may determine an afterimage prevention operation mode. For example, when the image is determined to be vulnerable to afterimages, the controller may strengthen an afterimage prevention compensation operation as described herein. Thus, the lifetime of a display panel may be further improved. In addition, since a compensation operation is reinforced in an environment in which blocks of a predetermined ratio or more display a fixed image (or still image) for more than several minutes, the possibility of deterioration in image quality may be reduced.

Although embodiments of the present disclosure have been described for illustrative purposes, those skilled in the art will appreciate that various modifications, and substitutions are possible, without departing from the scope and spirit of the disclosure as disclosed in the accompanying claims. Accordingly, the technical scope of the present disclosure is not limited to the detailed description of this specification, but should be defined by the claims.

What is claimed is:

1. An electronic device comprising:

a display panel configured to display an image; and a controller configured to receive image data corresponding to a frame and to drive the display panel, wherein the controller divides the image data into a plurality of blocks, and determines whether the image is a fixed image based on an inter-frame variation of each of the plurality of blocks, and the controller is configured to change an afterimage prevention operation mode when a number of blocks displaying the fixed image for a period equal to or greater than a first reference period among the plurality of blocks is equal to or greater than a threshold number of blocks.

2. The electronic device of claim 1, wherein, when the controller determines the inter-frame variation of a block of the plurality of blocks is equal to or less than a first threshold amount of change, the controller is configured to determine that the block displays the fixed image.

3. The electronic device of claim 2, wherein:

when the controller determines the block displays the fixed image, the controller is configured to accumulate a stack value of the block; and when the controller determines the block displays a moving image, the controller is configured to subtract the stack value of the block.

4. The electronic device of claim 1, wherein the controller is configured to:

determine a state of each of the plurality of blocks;

update a plurality of stack values corresponding to the plurality of blocks on a one-to-one basis based on the states of the plurality of blocks, wherein updating the plurality of stack values is every preset period; and change the afterimage prevention operation mode when a number of blocks having a stack value equal to or greater than a first reference stack value among the plurality of blocks is equal to or greater than the threshold number of blocks.

5. The electronic device of claim 4, wherein the state is a first state of displaying the fixed image or a second state of displaying a moving image.

6. The electronic device of claim 1, wherein the controller:

divides second image data corresponding to a second frame into a second plurality of blocks, wherein the second frame is subsequent or prior to the frame;

calculates a difference between first block image information of each of the plurality of blocks of the frame and second block image information of each of the second plurality of blocks of the second frame;

determines that a block of the plurality of blocks is in a first state when a ratio of the difference associated with the block is less than or equal to a state reference value; and determines that the block is in a second state when the ratio of the difference associated with the block is greater than the state reference value.

7. The electronic device of claim 6, wherein each of the first block image information and the second block image information includes at least one of an average luminance, an average gray level, and data about a detected edge of each of the plurality of blocks and the second plurality of blocks.

8. The electronic device of claim 5, wherein:

the plurality of blocks include a first block, and the plurality of stack values include a first stack value corresponding to the first block; and when the first block is in the first state, the controller accumulates a first value to the first stack value, and when the first block is in the second state, the controller subtracts a second value from the first stack value.

9. The electronic device of claim 8, wherein the first value is based on an average luminance of the first block.

10. The electronic device of claim 9, wherein the first value when the average luminance is a first luminance is less than the first value when the average luminance is a second luminance greater than the first luminance.

11. The electronic device of claim 4, wherein the afterimage prevention operation mode includes a first operation mode and a second operation mode different from the first operation mode, and the controller changes the afterimage prevention operation mode from the first operation mode to the second operation mode when the number of the blocks is equal to or greater than the threshold number of blocks.

12. The electronic device of claim 11, wherein:

in the first operation mode, the controller reduces a luminance of the image data by a first ratio when the luminance of the image data is greater than or equal to a first reference luminance;

in the second operation mode, the controller reduces the luminance of the image data by a second ratio when the luminance of the image data is equal to or greater than a second reference luminance; and the first reference luminance is greater than or equal to the second reference luminance.

13. The electronic device of claim 12, wherein the second ratio is greater than or equal to the first ratio.

14. The electronic device of claim 11, wherein the controller:

positions and displays the image data by X number of pixels in a first period in the first operation mode; and positions and displays the image data by Y number of pixels in a second period in the second operation mode, wherein the Y number is greater than or equal to the X number.

15. The electronic device of claim 14, wherein the second period is less than or equal to the first period.

16. A method of operating a display device, the method comprising:

receiving image data;

dividing the image data into a plurality of blocks and determining a state of each of the plurality of blocks;

updating a plurality of stack values corresponding to the plurality of blocks on a one-to-one basis based on the state of each of the plurality of blocks, wherein updating the plurality of stack values is at preset periods;

detecting a number of blocks having a stack value greater than or equal to a first reference stack value among the plurality of blocks; and changing an afterimage prevention operation mode when the number of blocks having the stack value equal to or greater than the first reference stack value is greater than or equal to a threshold number of blocks.

17. The method of claim 16, wherein the determining of the state comprises:

calculating first block image information of each of the plurality of blocks of a first frame;

dividing second image data corresponding a second frame into a second plurality of blocks, wherein the second frame is subsequent or prior to the first frame;

calculating second block image information of each of the second plurality of blocks of the second frame;

calculating a difference between the first block image information and the second block image information;

comparing the difference with a state reference value;

determining that a block of the plurality of blocks is in a first state when a ratio of the difference associated with the block is less than or equal to the state reference value; and determining that the block is in a second state different from the first state when the ratio of the difference associated with the block exceeds the state reference value.

18. The method of claim 17, wherein:

the plurality of blocks include a first block, and the plurality of stack values include a first stack value corresponding to the first block; and the updating of the plurality of stack values includes:

accumulating a first value to the first stack value when the first block is in the first state; and subtracting a second value from the first stack value when the first block is in the second state.

19. The method of claim 18, wherein:

the first value is based on an average luminance of the first block; and the first value when the average luminance is a first luminance is less than the first value when the average luminance is a second luminance higher than the first luminance.

20. The method of claim 17, wherein each of the first block image information and the second block image information includes at least one of an average luminance, an average gray level, and data about a detected edge of each of the plurality of blocks and the second plurality of blocks.

* * * * *